(12) United States Patent
Nakano (10) Patent No.: US 8,115,692 B2
(45) Date of Patent: Feb. 14, 2012

(54) ELECTRONIC APPARATUS

(75) Inventor: Masanori Nakano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/870,603

(22) Filed: Aug. 27, 2010

(65) Prior Publication Data

US 2010/0321906 A1    Dec. 23, 2010

Related U.S. Application Data

(63) Continuation of application No. 12/555,617, filed on Sep. 8, 2009, now abandoned.

(30) Foreign Application Priority Data

Nov. 28, 2008  (JP) .................................. 2008-305126

(51) Int. Cl.
    *H01Q 1/24*    (2006.01)
(52) U.S. Cl. .................................. 343/702; 343/700 MS
(58) Field of Classification Search .................. 343/702, 343/700 MS, 846, 848
    See application file for complete search history.

(56) References Cited

U.S. PATENT DOCUMENTS

| | | | |
|---|---|---|---|
| 4,980,694 A * | 12/1990 | Hines | 343/702 |
| 6,002,367 A * | 12/1999 | Engblom et al. | 343/700 MS |
| 6,225,959 B1 * | 5/2001 | Gordon | 343/769 |
| 6,448,933 B1 * | 9/2002 | Hill et al. | 343/702 |
| 6,491,499 B1 | 12/2002 | Marvin et al. | |
| 6,531,985 B1 | 3/2003 | Jones et al. | |
| 6,894,650 B2 * | 5/2005 | Darden et al. | 343/702 |
| 7,321,334 B2 | 1/2008 | Yu | |
| 2003/0080906 A1 | 5/2003 | Miyasaka | |
| 2010/0073241 A1 * | 3/2010 | Ayala Vazquez et al. | 343/702 |

FOREIGN PATENT DOCUMENTS

| | | |
|---|---|---|
| JP | 2000-259295 | 9/2000 |
| JP | 2003-209419 | 7/2003 |
| JP | 2004-118666 | 4/2004 |
| JP | 2004-236179 | 8/2004 |
| JP | 2006-304037 | 11/2006 |
| JP | 2007-043558 | 2/2007 |

* cited by examiner

*Primary Examiner* — Hoanganh Le
(74) *Attorney, Agent, or Firm* — Blakely, Sokoloff, Taylor & Zafman LLP (57) ABSTRACT

According to one embodiment, an electronic apparatus is provided with a housing and a communication module mounted in the housing. The communication module includes an element section and a ground section, and is arranged so that the element section is opposed to an inner surface of the housing to enable the communication module to communicate with another communication module opposed thereto from outside the housing. The housing is provided with a holder section which contains the communication module. The holder section includes a conductive section which surrounds a periphery of the communication module in all directions except a direction from the element section toward the inner surface of the housing.

19 Claims, 5 Drawing Sheets

ELECTRONIC APPARATUS

CROSS-REFERENCE TO RELATED APPLICATIONS

This application is a continuation application and claims the benefit of priority on U.S. patent application Ser. No. 12/555,617, filed Sep. 8, 2009, which is based upon and claims the benefit of priority from Japanese Patent Application No. 2008-305126, filed Nov. 28, 2008, the entire contents of which are incorporated herein by reference.

BACKGROUND

1. Field

One embodiment of the invention relates to an electronic apparatus provided with an antenna.

2. Description of the Related Art

Electronic apparatuses, such as portable computers, are provided with an antenna. Jpn. Pat. Appln. KOKAI Publication No. 2003-209419 discloses an electronic apparatus that is provided with an antenna element located near a sidewall of its housing. This antenna element is held between a housing base and housing cover.

Various electronic components are contained in the housing of the electronic apparatus. In some cases, noise generated by these electronic components may adversely affect the antenna. Conversely, noise from the antenna may adversely affect the electronic components.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus comprises a housing and a communication module mounted in the housing. The communication module comprises an element section and a ground section, and is arranged so that the element section is opposed to an inner surface of the housing to enable the communication module to communicate with another communication module opposed thereto from outside the housing. The housing is provided with a holder section which contains the communication module. The holder section comprises a conductive section which surrounds a periphery of the communication module in all directions except a direction from the element section toward the inner surface of the housing.

Embodiments of the present invention applied to portable computers will now be described with reference to the accompanying drawings.

First Embodiment

Figure 1:
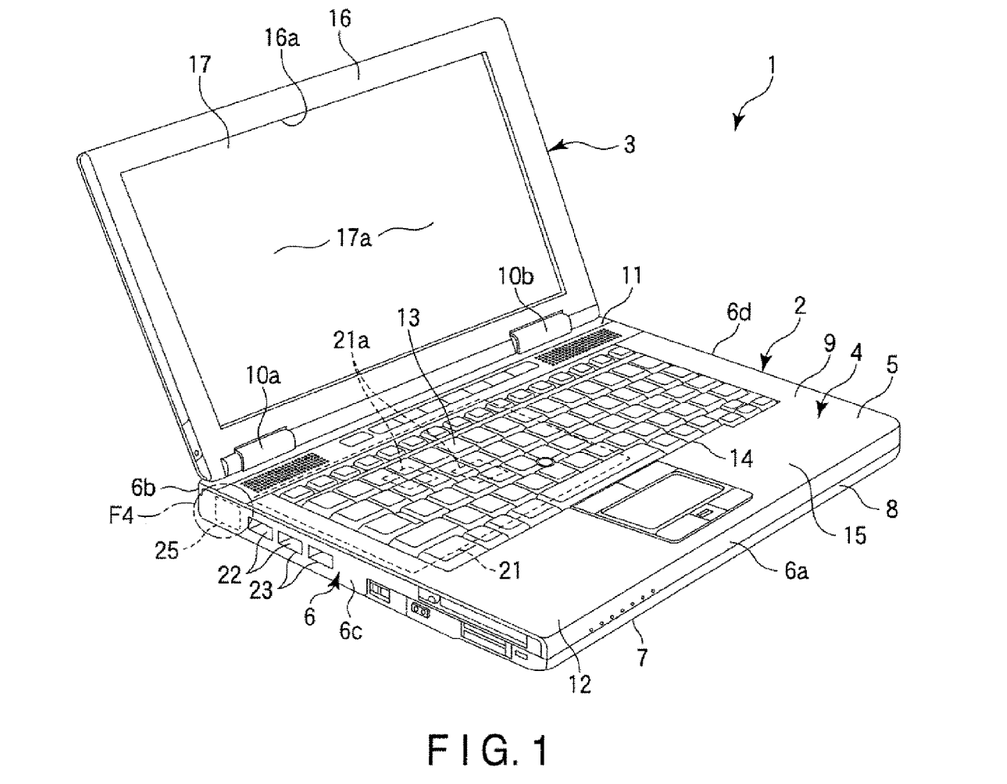
FIG. 1 is an exemplary perspective view of a portable computer according to a first embodiment of the invention.

FIGS. 1 to 7 show a portable computer 1 as an electronic apparatus according to a first embodiment of the invention. As shown in FIG. 1, the computer 1 is provided with a main unit 2 as an apparatus main body and a display unit 3.

The main unit 2 comprises a main housing 4 in the form of a flat box. The main housing 4 is an example of a housing according to the invention. The main housing 4 comprises a top wall 5, peripheral wall 6, and bottom wall 7. The top wall 5 spreads substantially horizontally. The peripheral wall 6 extends downward from an edge part (e.g., overall peripheral edge part) of the top wall 5. The bottom wall 7 spreads substantially horizontally (i.e., substantially parallel to the top wall 5) so as to connect lower end parts of the peripheral wall 6.

The main housing 4 comprises a housing base (i.e., bottom cover) 8 and a housing cover (i.e., top cover) 9. The housing base 8 comprises the bottom wall 7 and part of the peripheral wall 6. The housing cover 9 comprises the top wall 5 and part of the peripheral wall 6. The cover 9 is combined with the housing base 8 from above.

As shown in FIG. 1, the display unit 3 is supported on a rear end part 11 of the main housing 4 by, for example, a pair of hinge parts 10a and 10b. The display unit 3 is swingable between a closed position in which it is leveled so as to cover the top wall 5 from above and an open position in which it is raised on the top wall 5.

The main housing 4 comprises a front end part 12 on the opposite side thereof from the display unit 3. The peripheral wall 6 comprises a front wall 6a, rear wall 6b, and a pair of sidewalls (i.e., side parts) 6c and 6d, left and right. The front wall 6a is located at the front end part 12 of the main housing 4. The rear wall 6b is located at the rear end part 11 (i.e., end part that supports the display unit 3) of the main housing 4. The left and right sidewalls 6c and 6d individually extend between respective edge parts of the front and rear walls 6a and 6b.

As shown in FIG. 1, the top wall 5 comprises a keyboard mounting section 14, on which a keyboard 13 is mounted, and supports the keyboard 13. The top wall 5 comprises a palm-rest section 15 located on the user side of the keyboard mounting section 14 (i.e., closer to the front wall 6a than the mounting section 14).

As shown in FIG. 1, the display unit 3 is provided with a display housing 16 and display panel 17 contained in the display housing 16. The display panel 17 comprises a display screen 17a. The display screen 17a is exposed to the outside of the display housing 16 through an opening 16a in a front wall of the display housing 16.

The main housing 4 contains a circuit board 21 (e.g., main board). Various electronic components 21a, comprising a CPU, various I/O ports 22, etc., are mounted on the circuit board 21. The I/O ports 22 may be USB, RGB, and LAN ports, for example. As shown in FIG. 1, the I/O ports 22 are exposed sideways from the main housing 4 through openings 23 in the peripheral wall 6 (e.g., left and right sidewalls 6c and 6d and rear wall 6b).

Figure 2:
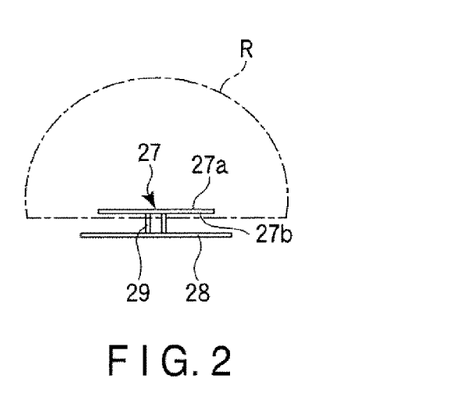
FIG. 2 is an exemplary side view of a communication module according to the first embodiment of the invention.
Figure 3:
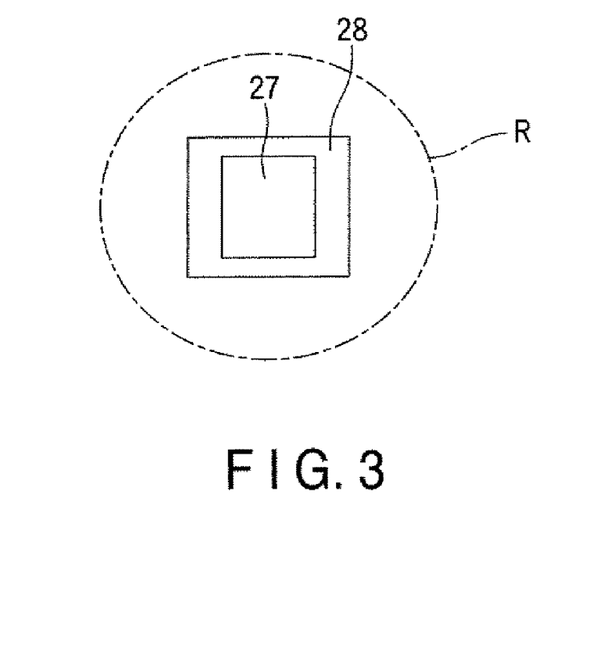
FIG. 3 is an exemplary plan view of the communication module according to the first embodiment of the invention.
Figure 4:
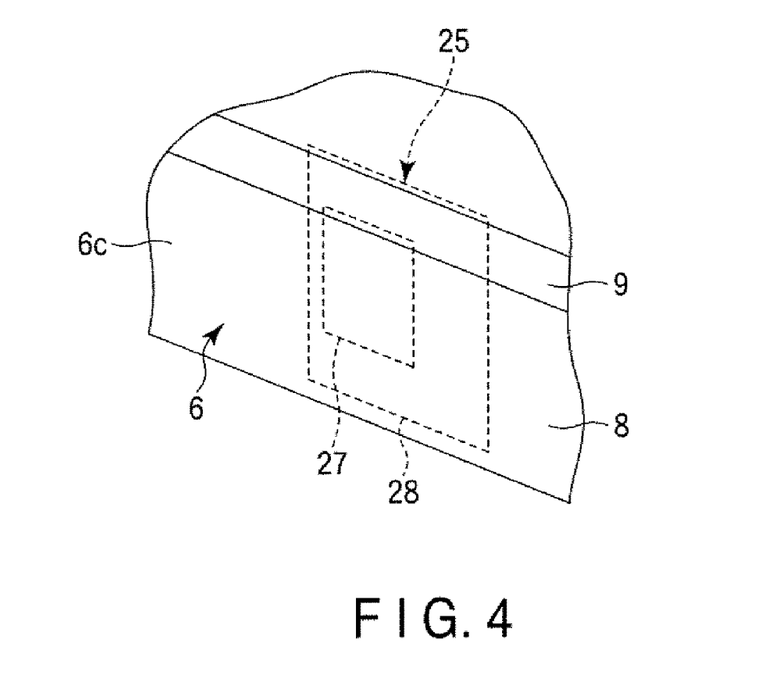
FIG. 4 is an exemplary enlarged perspective view showing a region of the portable computer enclosed by line F4 in FIG. 1.
Figure 5:
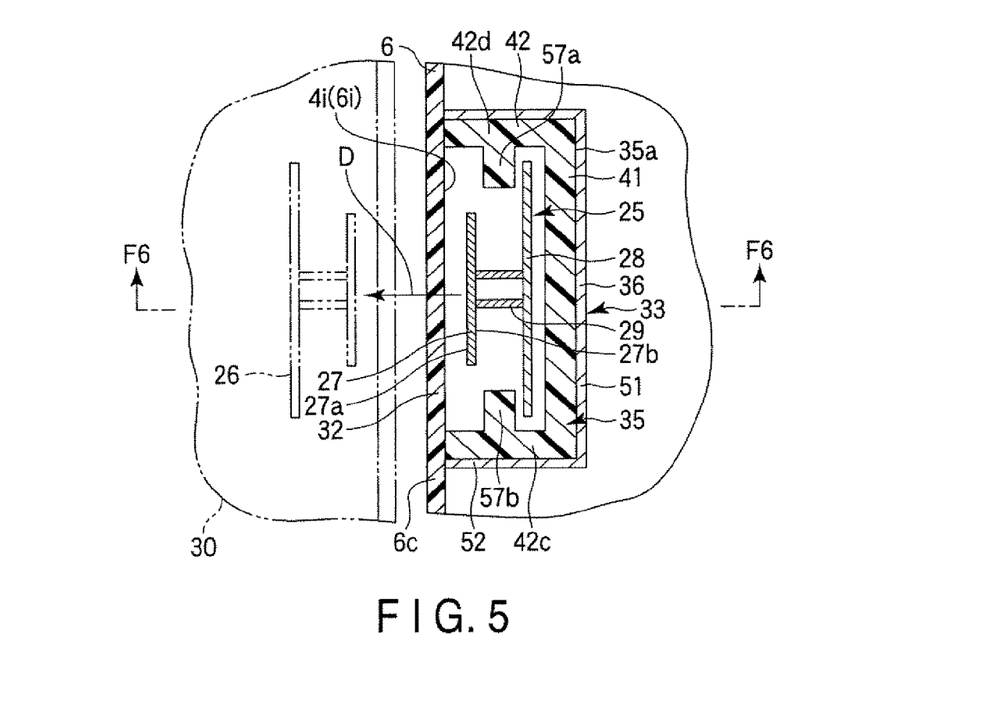
FIG. 5 is an exemplary plan view of a holder section according to the first embodiment of the invention.

As shown in FIG. 1, the portable computer 1 is provided with a communication module 25 mounted in the main housing 4. FIGS. 2 and 3 typically show the basic structure of the communication module 25. The communication module 25 according to the present embodiment is a communication device for near-field communication. The communication module 25 is a so-called coupler that serves as an antenna for wireless communication. As shown in FIG. 5, the communication module 25 performs near-field communication with another communication module 26 (i.e., coupler to be paired) that is opposed to the module 25 from outside the main housing 4. An example of the module 25 is a coupler for TransferJet (trademark). The high-speed communication range of the module 25 is, for example, 3 cm.

As shown in FIG. 2, the communication module 25 comprises an element section (i.e., electrode section) 27 and ground section 28. The element section 27 is, for example, an electrically-conductive plate-like metal piece. The ground section 28 comprises, for example, a substrate, ground plane superposed on the substrate, and resonance stub provided on the substrate. The ground plane has ground potential and a size that covers, for example, the overall external shape of the ground section 28.

The element section 27 is located parallel to the ground section 28 with a gap therebetween. Leg sections 29 are provided between the element section 27 and ground section 28. The element section 27 is supported on the ground section 28 by the leg sections 29.

The element section 27 has a first surface (i.e., communication surface) 27a farther from the ground section 28 and a second surface 27b opposed to the ground section 28. As shown in FIG. 2, a high-speed communication area R of the communication module 25 has a hemispherical shape radially spreading from the element section 27. The module 25 has directivity coincident with a direction D of orientation of the first surface 27a (i.e., direction from the ground section 28 toward the element section 27). The module 25 expects communication performance only in the one direction D in which the first surface 27a is oriented.

Figure 6:
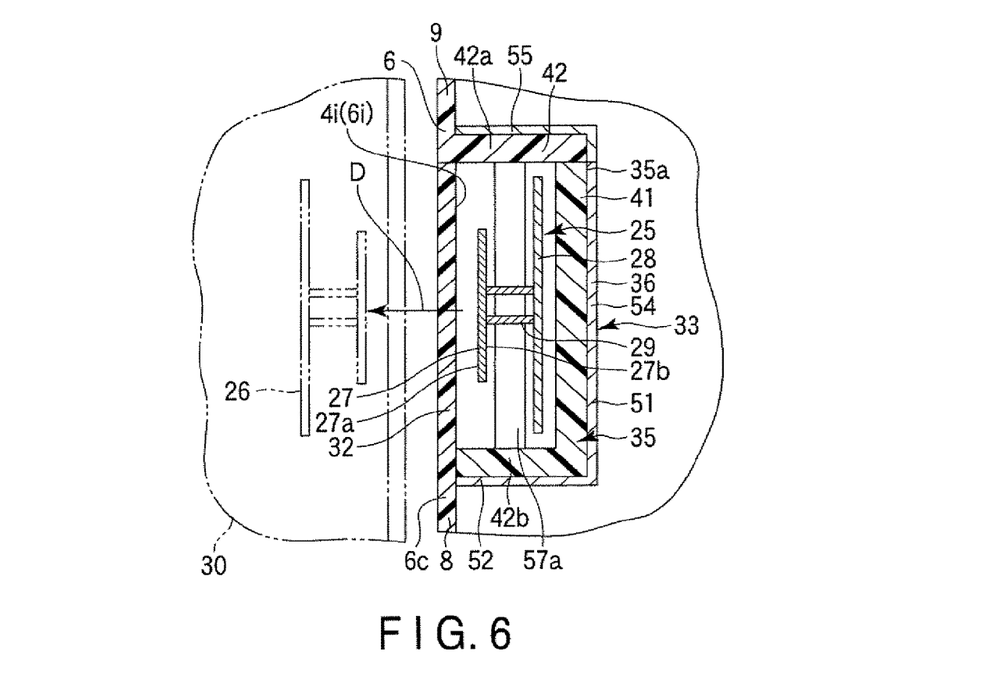
FIG. 6 is an exemplary sectional view of the holder section taken along line F6-F6 in FIG. 5.

As shown in FIGS. 1, 4, 5 and 6, the communication module 25 is located along, for example, the peripheral wall 6 of the main housing 4. More specifically, the module 25 is located along the left sidewall 6c (or right sidewall 6d). As shown in FIGS. 5 and 6, the communication module 25 is vertically located along the peripheral wall 6 so that the element section 27 faces outwardly (i.e., sideways) relative to the main housing 4. The element section 27 is opposed to an inner surface 4i of the main housing 4 (e.g., an inner surface 6i of the peripheral wall 6). The ground section 28 is located deeper in the main housing 4 than the element section 27.

Specifically, the communication module 25 has its high-speed communication area directed laterally to the portable computer 1. In other words, the module 25 has its directivity lateral to the computer 1. Thus, if another electronic apparatus 30 (e.g., cellular phone or digital camera) with the other communication module 26 is placed beside the computer 1, for example, the communication module 25 is enabled to communicate with the other communication module 26.

As shown in FIGS. 5 and 6, the main housing 4 comprises a non-conductive section 32 in at least a part of the housing 4 which opposed to the element section 27. The "part opposed to the element section 27" is a part that covers the communication module 25 from the outside (i.e., from outside the housing) and is to be located between the communication modules 25 and 26. The non-conductive section 32 is formed of a non-conductive material, e.g., a plastic material. For example, the entire main housing 4 according to the present embodiment is formed of a plastic material (i.e., non-conductive section 32). Alternatively, only a part of the housing 4 may be formed of the non-conductive section 32.

As shown in FIGS. 5 and 6, the main housing 4 is provided with a holder section 33 that contains the communication module 25. The holder section 33 may be either formed integrally with the main housing 4 or formed separately from the housing 4 and attached to the housing 4. For example, the holder section 33 is a pocket in the main housing 4. In conjunction with the non-conductive section 32, the holder section 33 surrounds the periphery (i.e., top, bottom, left, right, front, and rear parts) of the communication module 25.

More specifically, the holder section 33 according to the present embodiment comprises a holder body section 35 and conductive section 36. The holder body section 35 comprises first and second holder wall parts 41 and 42 of a plastic material. The first holder wall part 41 rises vertically behind the ground section 28 of the communication module 25 in the main housing 4 and faces the module 25 on the side opposite from the non-conductive section 32. In other words, the first holder wall part 41 is opposed to the ground section 28.

The second holder wall part 42 extends from an edge part (e.g., overall peripheral edge part) of the first holder wall part 41 to the inner surface 6i of the peripheral wall 6 (i.e., non-conductive section 32). As shown in FIG. 6, the second holder wall part 42 comprises upper and lower wall parts 42a and 42b extending from the upper and lower end parts, respectively, of the first holder wall part 41. As shown in FIG. 5, the second holder wall part 42 further comprises a pair of sidewall parts (i.e., front and rear wall parts 42c and 42d) extending individually from a pair of edge parts (front and rear edge parts) of the first holder wall part 41. Thus, the holder body section 35 is laterally recessed in the main housing 4.

As shown in FIGS. 5 and 6, the conductive section 36 of the holder section 33 is provided on a surface 35a (e.g., outer surface) of the holder body section 35. The conductive section 36 surrounds and covers the periphery of the communication module 25 in all directions except the direction D from the element section 27 toward the inner surface 4i of the main housing 4 (i.e., direction coincident with the directivity of the element section 27).

More specifically, the conductive section 36 comprises a first part 51 on the surface 35a of the first holder wall part 41 and a second part 52 on the surface 35a of the second holder wall part 42 (i.e., upper and lower wall parts 42a and 42b and sidewall parts 42c and 42d). The first part 51 covers the communication module 25 from the side opposite from the non-conductive section 32. The second part 52 extends from an edge part (e.g., overall peripheral edge part) of the first part 51 toward the non-conductive section 32. The second part 52 extends to, for example, the inner surface 4i of the main housing 4.

For example, the conductive section 36 is a metallic deposit formed by plating on the surface 35a of the holder body section 35. However, the conductive section 36 is not limited the deposit based on plating, and it may alternatively be formed by, for example, metal vapor deposition, conductive coating, or foiling. Alternatively, moreover, the conductive section 36 may be provided on the inner surface of the holder body section 35.

Figure 7:
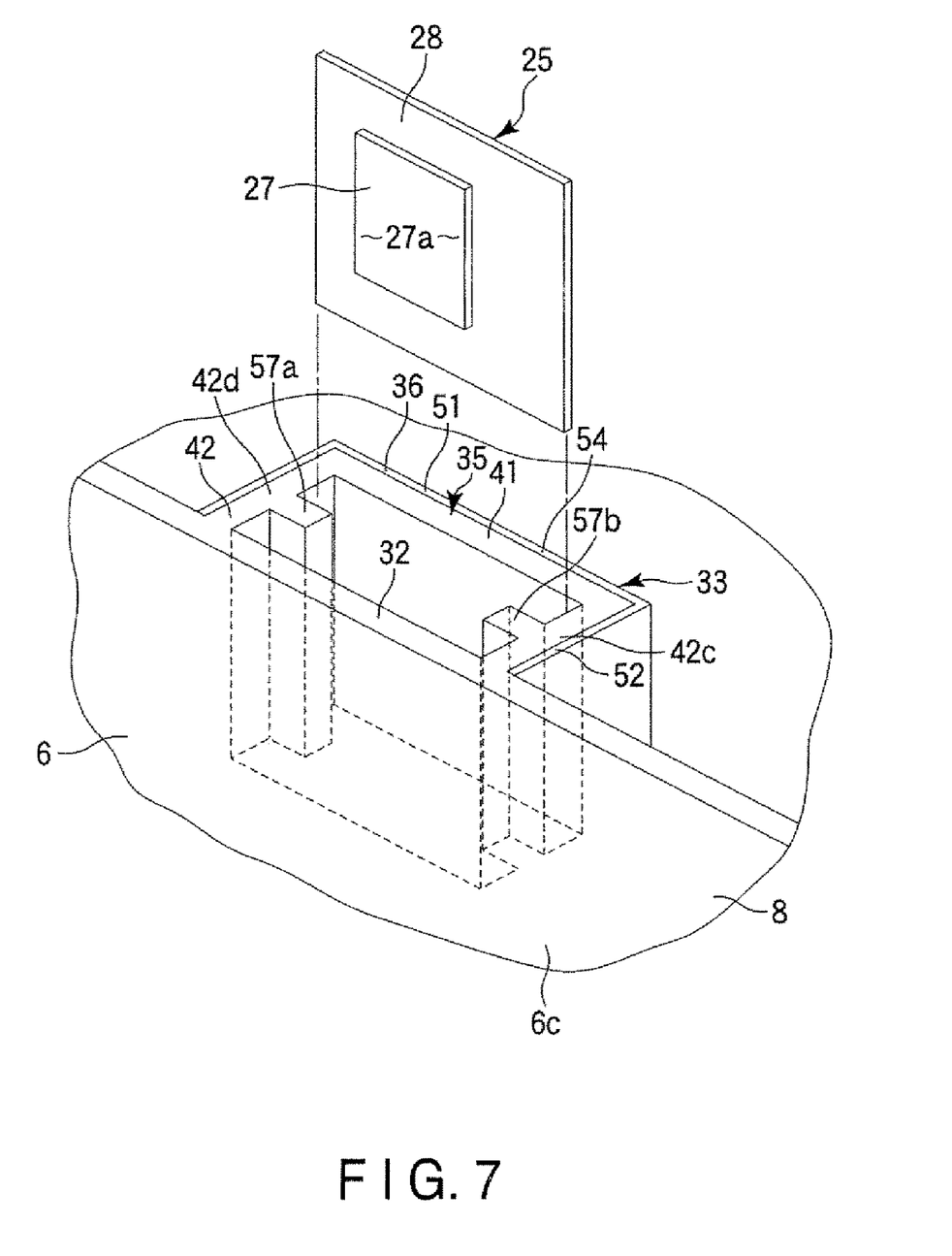
FIG. 7 is a partial exploded, exemplary perspective view of the holder section shown in FIG. 5.

As shown in FIGS. 6 and 7, the first holder wall part 41, and the lower wall part 42b and sidewall parts 42c and 42d of the second holder wall part 42, are provided on the housing base 8. Thus, the housing base 8 is provided with a containing section that is open on one side (e.g., upper side). On the other hand, the upper wall part 42a of the second holder wall part 42 is provided on the housing cover 9. The upper wall part 42a serves as a lid that closes the containing section. Specifically, the second holder wall part 42 is divided into parts on the housing base 8 and housing cover 9, individually.

The conductive section 36 is divided into first and second conductor parts 54 and 55. The first conductor part 54, along with the lower wall part 42b and sidewall parts 42c and 42d of the second holder wall part 42, is provided on the housing base 8. The second conductor part 55, along with the upper wall part 42a, is provided on the housing cover 9. The housing cover 9 is combined with the housing base 8 to form the conductive section 36.

As shown in FIGS. 5 and 7, the holder section 33 comprises a pair of ribs 57a and 57b located between the element section 27 and ground section 28. The ribs 57a and 57b hold the communication module 25 with the ground section 28 interposed between the first holder wall part 41 and themselves.

According to the portable computer 1 constructed in this manner, the influence of noise can be suppressed. Specifically, the conductive section 36 on the holder section 33 surrounds the periphery of the communication module 25 in all directions except the direction D from the element section 27 toward the inner surface 4i of the main housing 4 (i.e., direction in which communication of the communication module 25 is expected). With this arrangement, a noise insulation wall (i.e., shielding layer) is formed around the communication module 25.

Thus, the influences of noise from inside the main housing 4 (e.g., from the circuit board 21 and electronic components 21a) on the communication module 25 and noise from the module 25 on the interior of the main housing 4 are reduced.

In the case of an antenna for wireless LAN, for example, omnidirectional communication is expected, so that metals around the antenna should be minimized. However, the communication module 25 according to the present embodiment is configured to communicate with said another communication module 26 that is opposed to the module 25 from outside the main housing 4. In this case, the near-field communication must be performed only in a specific expected direction, so that the metals can cover the other directions. Thus, the aforementioned noise countermeasure can be properly taken.

If the main housing 4 has the non-conductive section 32 at least in that part thereof which faces the element section 27, the electronic apparatus provided with the conductive section 36 constructed in the aforementioned manner can also maintain satisfactory communication performance with respect to the direction in which the communication is expected.

The conductive section 36 comprises the first part 51, which covers the communication module 25 from the side opposite from the non-conductive section 32, and the second part 52, which extends from the edge part of the first part 51 to the non-conductive section 32. Therefore, the communication module 25 is multidirectionally covered by the conductive section 36, so that the influence of noise can be reduced. If the second part 52 extends from the overall peripheral edge part of the first part 51, the influence of noise can be further reduced.

In the case of a portable computer in which the communication module 25 is located below the palmrest section 15, for example, if data communication is performed for a long time with a cellular phone or digital camera placed on the palmrest section 15, it hinders the operation of the keyboard 13. Further, the communication module 25 cannot achieve satisfactory communication if a magnesium housing is used or if the main housing 4 is designed with a metallic coating or surface treatment such that the palmrest section 15 is metallically coated or decorated.

However, if the communication module 25 is arranged so that the element section 27 is opposed to the inner surface 6i of the peripheral wall 6, as in the present embodiment, the other communication module 26 (point-to-point communication device) can be placed beside the portable computer 1 when it is operated. Therefore, a user's keyboard operation cannot be easily hindered by prolonged data communication. Since the communication module 25 is located on a peripheral wall part (lateral part) of the main housing 4, moreover, it need not be disposed on the palmrest section 15. Thus, a magnesium housing may be used for the palmrest section 15, or the palmrest section 15 may be metallically coated or decorated.

In many cases, the circuit board 21 and the various I/O ports 22, comprising USB, RGB, and LAN ports, are mounted near the peripheral wall of the portable computer 1, and their noise is liable to cause mutual interference. Since the communication module 25 expects communication only in the specific direction and is provided with the conductive section 36 according to the present embodiment, however, the influence of the noise can be reduced even in those noise-affected areas.

For wider-range communication, it is advantageous to locate the antenna for wireless LAN or the like in a region near the upper end part of the display unit 3 high above floor level. However, the communication module 25 for near-field communication can be located in the main housing 4, since only communication in the vicinity of the module 25 is expected. Further, satisfactory performance can be secured even if the communication module 25 is located at the peripheral wall part of the main housing 4 that is surrounded by a lot of metallic parts, such as the I/O ports 22.

The conductive section 36 comprises the first and second conductor parts 54 and 55 that are provided on the housing base 8 and housing cover 9, respectively, and can be formed by combining the housing cover 9 with the housing base 8. Thus, the conductive section 36, which surrounds the periphery of the communication module 25 in all directions except the direction D from the element section 27 toward the inner surface 4i of the main housing 4, can be formed by only combining the housing cover 9 with the housing base 8 after the communication module 25 is attached to the housing base 8. This serves to improve the assemblability of the portable computer 1. If the holder section 33 comprises the ribs 57a and 57b that hold the communication module 25, the module 25 can be held steadily.

Second Embodiment

Figure 8:
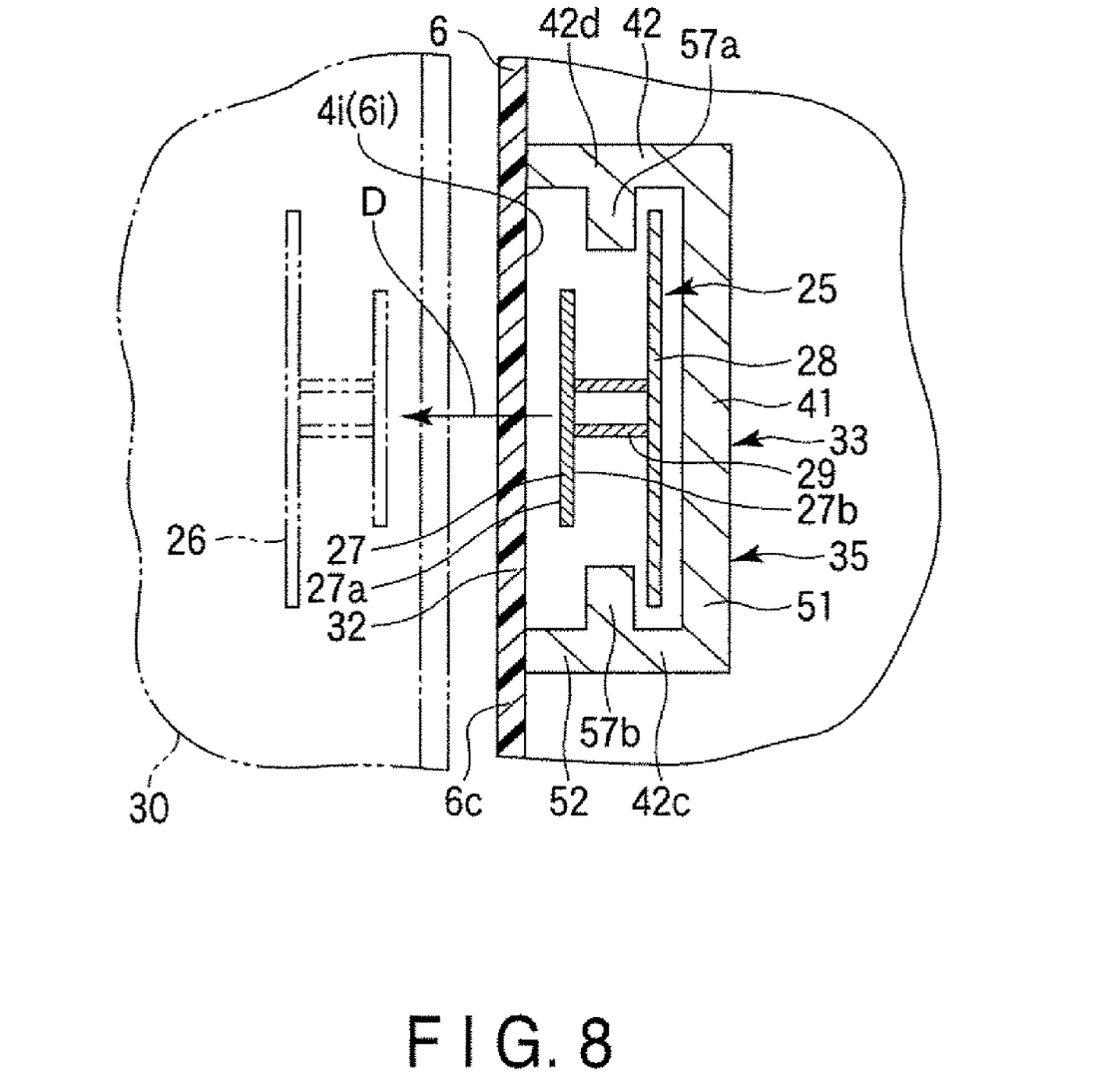
FIG. 8 is an exemplary sectional view of a holder section according to a second embodiment of the invention.

A portable computer 1 as an electronic apparatus according to a second embodiment of the invention will now be described with reference to FIG. 8. Like numbers refer to configurations with functions identical or similar to those of the first embodiment, and a description of those configurations is omitted. Further, configurations of the computer 1 other than the ones described below are the same as those of the first embodiment.

A holder section 33 according to the present embodiment comprises a holder body section 35. The holder body section 35 of the present embodiment is metallic and electrically-conductive. More specifically, a first holder wall part 41 and second holder wall part 42 (upper and lower wall parts 42a and 42b and sidewall parts 42c and 42d) are formed of a metal material.

The holder body section 35 of the present embodiment is an example of a conductive section according to the present invention. The holder body section 35 surrounds and covers the periphery of a communication module 25 in all directions except a direction D from an element section 27 toward an inner surface 4i of a main housing 4 (i.e., direction coincident with the directivity of the element section 27).

According to the portable computer 1 constructed in this manner, the influence of noise can be suppressed in the same manner as in the first embodiment.

Although the portable computers 1 according to the first and second embodiments of the present invention have been described herein, the invention is not limited to these embodiments. The components of the embodiments may be suitably combined in carrying out the invention.

Further, the components of the present invention may be embodied in modified forms without departing from the scope or spirit of the invention. For example, the communication module 25 may be located in a region along the top wall 5, e.g., under the palmrest section 15. For example, moreover, the module 25 may be located on each of the peripheral wall part and palmrest section 15 of the portable computer 1. In this case, the module 25 at the palmrest section 15 can be used for communication despite the presence of the other communication module 26 (point-to-point communication device), which mechanically cannot perform communication with ease when it is opposed to the peripheral wall part of the computer 1. For a point-to-point communication device having no mechanical problems, furthermore, the aforementioned effect can be obtained by communication through the communication module 25 at the peripheral wall part of the computer 1.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing comprising a holder section on an inner surface;
a circuit board in the housing; and
a communication module in the holder section, comprising an element section and a ground section, the communication module configured to communicate with another communication module when the another communication module exists outside the housing and beside the holder section; and
the holder section comprising a holder body section made of non-conductive material, and a conductive section covering outer surface of the holder body section except a region of the inner surface of the housing that faces the element section.

2. An electronic apparatus of claim 1, wherein
the holder section comprises a gap between the inner surface of the housing and the element section, and the conductive section comprises a first portion between the ground section and the circuit board, and a second portion extending from the first portion toward the inner surface of the housing beyond the element section.

3. An electronic apparatus of claim 2, wherein the second portion of the conductive section is tubular, extends from a peripheral edge portion of the first portion and surrounds the gap.

4. An electronic apparatus of claim 1, wherein
the conductive section comprises a first portion between the element section and the circuit board, and a second portion extending from the first portion toward the inner surface of the housing, and
the second portion of the conductive section is connected to the inner surface of the housing.

5. An electronic apparatus of claim 1, wherein
the conductive section comprises a first portion between the element section and the circuit board, and a second portion extending from the first portion toward the inner surface of the housing, and
the second portion of the conductive section is tubular, extending from a peripheral edge portion of the first portion and reaching the inner surface of the housing, to surround an whole periphery of the communication module except a region of the inner surface of the housing that faces the element section.

6. An electronic apparatus of claim 1, wherein the communication module forms a communication range in a several centimeters in front of the element section, and is configured to communicate with said another communication module when said another communication module is in the communication range.

7. An electronic apparatus of claim 1, wherein
the housing comprises a first wall with an input section, a second wall on an opposite side of the first wall, and a third wall between an edge portion of the first wall and an edge portion of the second wall, and
the communication module is opposed to an inner surface of the third wall.

8. An electronic apparatus of claim 1, wherein
the housing comprises a top wall with an input section, a bottom wall under the top wall, and a peripheral wall between an edge portion of the top wall and an edge portion of the bottom wall, and
the communication module is opposed to the inner surface of the peripheral wall.

9. An electronic apparatus of claim 1, wherein the communication module further comprises a leg section configured to support the element section on the ground section to make a gap between the ground section and the element section.

10. An electronic apparatus comprising:
a housing comprising a holder section on an inner surface;
a circuit board in the housing; and
a communication module in the holder section, the communication modules comprising an element section facing the inner surface of the housing and a ground section, the communication module having a directivity area in front of the element section and being configured to communicate with another communication module when the another communication module exists in the directivity area outside the housing and beside the holder section,
wherein the holder section comprising a holder body section made of non-conductive material, and a conductive section covering an outer surface of the holder body section except a region of the inner surface of the housing that faces the element section.

11. An electronic apparatus of claim 10, wherein the holder section comprises a gap between the inner surface of the housing and the element section, and the conductive section comprises a first portion provided in front of the ground section, and a second portion extending from the first portion toward the inner surface of the housing beyond the element section.

12. An electronic apparatus of claim 11, wherein the second portion of the conductive section abuts on the inner surface of the housing.

13. An electronic apparatus comprising:
a housing comprising a holder section on an inner surface; and
a communication module configured to be enclosed in the holder section, the communication module comprising an element section facing the inner surface of the housing and a ground section, the communication module being configured to communicate with another communication module opposed to the element section from outside the housing,
the holder section comprising a holder body section made of non-conductive material and a conductive section surrounding a periphery of the holder body section in all directions except a region of the inner surface of the housing that faces the element section.

14. An electronic apparatus of claim 13, wherein the holder section comprises a non-conductive section opposed to the element section.

15. An electronic apparatus of claim 14, wherein the conductive section comprises a first part configured to cover the ground section of the communication module, and a second part extending from a peripheral edge of the first part to the non-conductive section.

16. An electronic apparatus of claim 15, wherein the second part extends from the overall peripheral edge of the first part.

17. An electronic apparatus of claim 13, wherein
the housing comprises a substantially horizontally spreading top wall, a peripheral wall extending downward from an edge part of the top wall, and a bottom wall spreading substantially horizontally so as to connect the lower end part of the peripheral wall, and
the communication module is arranged so that the element section is opposed to an inner surface of the peripheral wall.

18. An electronic apparatus of claim 17, wherein
the housing comprises a housing base comprising the bottom wall, and a housing cover comprising the top wall and combined with the housing base, and
the conductive section comprises a first conductor part provided on the housing base, and a second conductor part provided on the housing cover.

19. An electronic apparatus of claim 13, wherein
the holder section comprises a rib located between the element section and the ground section to hold the communication module.

* * * * *